United States Patent
Frederick et al.

(10) Patent No.: US 10,609,263 B2
(45) Date of Patent: Mar. 31, 2020

(54) COMPACT CAMERA MODULE FOR OCCUPANT MONITORING SYSTEM

(71) Applicant: Joyson Safety Systems Acquisition LLC, Auburn Hills, MI (US)

(72) Inventors: Nicholas Frederick, Clarkston, MI (US); Michael Fleschner, Rochester Hills, MI (US)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 97 days.

(21) Appl. No.: 15/864,594

(22) Filed: Jan. 8, 2018

(65) Prior Publication Data

US 2018/0198961 A1    Jul. 12, 2018

Related U.S. Application Data

(60) Provisional application No. 62/443,880, filed on Jan. 9, 2017.

(51) Int. Cl.
*H04N 5/225* (2006.01)
*G02B 27/09* (2006.01)

(52) U.S. Cl.
CPC ....... *H04N 5/2254* (2013.01); *G02B 27/0977* (2013.01); *H04N 5/2253* (2013.01)

(58) Field of Classification Search
CPC . H04N 5/2254; H04N 5/2253; G02B 27/0977
See application file for complete search history.

(56) References Cited

U.S. PATENT DOCUMENTS

| | | | |
|---|---|---|---|
| 2005/0131607 A1 | 6/2005 | Breed | |
| 2008/0267618 A1* | 10/2008 | Lee | G03B 17/02 396/541 |
| 2009/0046149 A1 | 2/2009 | Ohsumi et al. | |
| 2010/0073584 A1* | 3/2010 | Harbach | G08B 21/06 349/1 |
| 2010/0260495 A1* | 10/2010 | Usami | B60R 11/04 396/419 |
| 2013/0329046 A1 | 12/2013 | Onishi et al. | |
| 2014/0012141 A1* | 1/2014 | Kim | A61B 1/00048 600/476 |

(Continued)

FOREIGN PATENT DOCUMENTS

JP    2005157648    6/2005

OTHER PUBLICATIONS

International Search Report and Written Opinion for International Application No. PCT/US2018/012772 dated Apr. 24, 2018.

*Primary Examiner* — Hung H Lam
(74) *Attorney, Agent, or Firm* — Meunier Carlin & Curfman LLC

(57) ABSTRACT

A camera module for an occupant monitoring system is disclosed. The camera module includes a housing with an interior chamber and an aperture on one surface. An image sensor is position within the chamber and aligned with the aperture. A lens is positioned between the image sensor and the aperture along an optical axis to focus light entering the aperture onto the image sensor. To reflect light into the aperture from a field of view that is not along the optical axis, the camera module includes a planar reflector that extends at an angle from the surface of the housing and over the aperture.

17 Claims, 4 Drawing Sheets

(56) References Cited

U.S. PATENT DOCUMENTS

2014/0240478 A1    8/2014   Nachtegall et al.
2016/0185354 A1    6/2016   Lisseman et al.
2018/0120572 A1*   5/2018   Watanabe ............... G06F 3/013

* cited by examiner

COMPACT CAMERA MODULE FOR OCCUPANT MONITORING SYSTEM

CROSS-REFERENCE TO RELATED APPLICATION

This application claims the benefit of U.S. Provisional Application No. 62/443,880, filed Jan. 9, 2017, which is hereby incorporated by reference in its entirety.

FIELD OF THE INVENTION

The present disclosure generally relates to an occupant monitoring system for a vehicle. More specifically, the present disclosure relates to a compact camera module for imaging the occupant.

BACKGROUND

Various advanced driver assistance systems incorporate visual, acoustic, and/or sensor warnings. Many of these warnings are in response to outside dangers (e.g., proximity of another object). However, in recent times, the number of potential distractions for a driver has increased (e.g., mobile phones, mp3 players, internal displays, etc.). Occupant monitoring systems (e.g., driver monitoring systems, operator monitoring systems) are becoming more popular for inclusion in vehicles, such as, to warn when the driver is detected to be in a non-alert state.

In various implementations, an occupant monitoring system (OMS) includes a camera module (e.g., imaging unit, camera assembly) with a field of view directed toward a cabin of the vehicle, such as in the direction of one or more occupants in the vehicle. The field of view may be configured to encapsulate an expected position of the occupant. The OMS also includes one or more processing units in electrical communication with the imaging unit that receives and processes an image signal from the camera module to determine an occupant state and, in some implementations, provide feedback (e.g., output) based on the determined occupant state. An implementation of the type of the OMS described above is further detailed in U.S. Pat. No. 9,533,687, entitled "Occupant Monitoring Systems and Methods," which is incorporated herein by reference in its entirety.

In prior implementations, the circuitry for the imaging and processing were disposed on distinct printed circuit boards (PCBs), in part, due to the alignment requirements for imaging the occupant. One such prior implementation is shown in Figure (FIG. 1.

FIG. 1 illustrates a side view of a camera module 101 for an OMS. The camera module includes circuitry for imaging 102 and circuitry for processing 103 connected by way of a flexible cable 104. A housing 105 supports and positions the imaging circuitry 102 to point in the direction 106 of one or more occupants in the vehicle.

In some implementations, the circuitry for imaging, circuitry for processing, and the flexible cable are fabricated using a rigid-flex circuit. Rigid flex circuits eliminate the need for a flexible cable by utilizing a flexible circuit layer bonded within the layers of two or more rigid multilayer circuits to form a flexible connection between the two or more rigid circuit boards. The flexible connection allows for the circuit boards to be positioned at an angle to one another. This approach is more convenient than attaching the boards by a flexible cable but suffers from added fabrication complexity and cost.

A need, therefore, exists for a camera module that (i) includes the imaging circuitry and processing circuitry incorporated on the same rigid circuit board and (ii) maintains a compact package size while still accommodating the positioning requirements for capturing an image of the vehicle occupant.

SUMMARY

Accordingly, in one aspect, the present disclosure embraces a camera module for an occupant monitoring system. The camera module includes a housing with an interior chamber (i.e., chamber) and an aperture on one surface (e.g., top surface). An image sensor is position within the chamber and aligned with the aperture. A lens is positioned between the image sensor and the aperture along an optical axis (e.g., an axis defined by the image sensor and the aperture) to focus light entering the aperture onto the image sensor. To reflect light into the aperture from a field of view that is not along the optical axis, the camera module includes a planar reflector that extends at an angle from the surface of the housing and over the aperture.

In an implementation of the camera module, the image sensor is disposed (e.g., electrically connected, soldered, etc.) flush with the surface of a (e.g., rigid) printed circuit board (PCB) that is installed within the chamber of the housing.

In another implementation of the camera module, a lens holder is mechanically coupled to the housing to support and position the lens at a distance (e.g., corresponding to the focal length of the lens) above the image sensor. In some implementations, the lens holder is adjustable in the housing to change the distance between the lens and the image sensor.

In another implementation of the camera module, the camera module includes an illuminator that projects light onto the planar reflector (e.g., along the optical axis) to illuminate the field of view.

In another implementation of the camera module, the planar reflector has a filtering property that allows it to reflect a particular band of wavelengths more than wavelengths that are not in the particular band.

In another implementation of the camera module, the camera module includes a reflector mount to support and position the planar reflector at an angle (between zero and 90 degrees) with the optical axis. The reflector mount may be defined by the housing (e.g., molded as part of the housing) or may be mechanically coupled (e.g., bonded, fastened, etc.) to the surface of the housing. In some implementations the reflector mount is adjustable to allow the angle of the planar reflector (with respected to the optical axis) to be changed.

In another aspect, the present disclosure embraces an occupant monitoring system (OMS) for a vehicle. The OMS includes a steering-column housing with an interior chamber (i.e., steering-column chamber) and an aperture (i.e., steering-column aperture). A camera module, as described above, is positioned within the steering-column chamber so that the camera module's planar reflector extends through the steering-column aperture to direct light from a field of view containing a vehicle occupant into the aperture of the camera module (i.e., module aperture) where it is focused by the camera module's lens onto the image sensor.

In an implementation of the OMS, the image sensor is disposed (e.g., electrically connected, soldered, etc.) flush with the surface of a (e.g., rigid) printed circuit board (PCB)

that is installed within the chamber of the camera module housing (i.e., module chamber).

In another implementation of the OMS, a lens holder is mechanically coupled to the module housing to support and position the lens at a distance (e.g., corresponding to the focal length of the lens) above the image sensor. In some implementations, the lens holder is adjustable in the module housing (e.g., via threads) to change the distance between the lens and the image sensor.

In another implementation of the OMS, the camera module includes an illuminator that projects light onto the planar reflector (e.g., along the optical axis) to illuminate the field of view containing the occupant.

In another implementation of the camera module, the planar reflector has a filtering property that allows it to reflect a particular band of wavelengths more than wavelengths that are not in the particular band.

In another implementation of the OMS, the camera module includes a reflector mount to support and position the planar reflector at an angle (between zero and 90 degrees) with the optical axis. The reflector mount may be defined by the module housing (e.g., molded as part of the housing) or may be mechanically coupled (e.g., bonded, fastened, etc.) to the surface (e.g., top surface) of the module housing. In some implementations, the reflector mount is adjustable to allow the angle of the planar reflector (with respected to the optical axis) to be changed (e.g., to reposition the field of view imaged by the image sensor).

In another aspect, the present disclosure embraces a method for capturing an image of a driver of a vehicle. The method includes fitting a PCB, having an image sensor mounted flush with the PCB surface, into the steering-column housing of a vehicle. Light from the driver is directed into an aperture in the steering column (e.g., on the top of the steering column) using a planar reflector. The directed light from the driver is then focused onto the image sensor using a lens.

In an implementation, the method also includes illuminating the driver with a light inside the vehicle.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily drawn to scale relative to each other, and like reference numerals designate corresponding parts throughout the several views.

DETAILED DESCRIPTION

The present disclosure embraces a camera module for an occupant monitoring system (OMS) that does not require an image sensor mounted flush with a rigid printed circuit board (PCB) to be aligned with the direction of the occupant in order to image the occupant.

Occupant monitoring systems include one or more digital cameras that image the occupant (e.g., the operator) while driving. A processor in the OMS system is configured (e.g., by software) to analyze the digital images (e.g., eye tracking, eyelid monitoring, facial recognition, etc.) for signs that the driver is engaged in a potentially unsafe behavior (e.g., lack of attention, drowsy, sleep, etc.). The OMS may warn the driver (e.g., via lights, messages, and/or sounds) when the behavior is detected. If the behavior persists, the OMS may take other measures to prevent an accident (e.g., apply brakes).

A camera (e.g., camera module, camera assembly) for an OMS is typically integrated with the steering column housing because images taken from this perspective provide a detailed, undistorted, and unobstructed view of the driver's face.

Integrating the camera with the steering column housing is complicated by a number of factors. First, the available space in the steering column area is limited. As a result, a camera must be compact to fit into the limited space and not obstruct the driver's view of the vehicle's instruments. Second, the camera must accommodate variations associated with the environment (e.g., light, dark, etc.), the occupant (e.g., tall, short), or the imaging geometry (e.g., seat position, steering wheel position, etc.) to obtain suitable images for analysis. As a result, a camera may have a field of view and depth of focus to accommodate a range of drivers and geometries, and may have illumination control, automatic gain control, or shutter control for imaging at night. Third, an OMS is constrained by cost. For example, complexity added to the camera to address the one or more of the factors described above is often prohibitively expensive.

Figure 2:
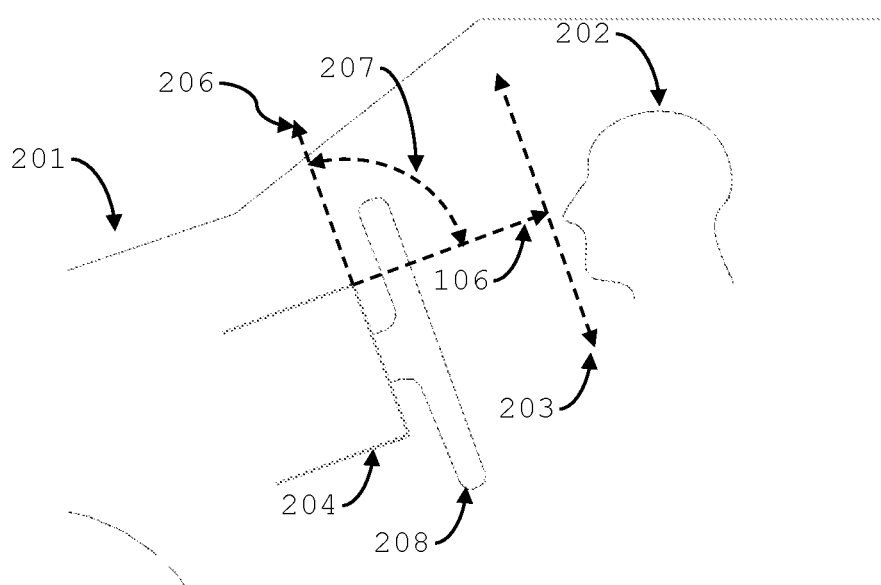
FIG. 2 graphically depicts a side view of an operator in a vehicle, the depiction illustrating the geometry for imaging according to one implementation of the present disclosure.

FIG. 2 illustrates the environment and geometry typical for an OMS. As shown in FIG. 2, the vehicle 201 includes an occupant (e.g., driver) 202 that operates the vehicle using a steering wheel 208 mounted to a steering column, which is contained within a steering column housing 204. The steering column is typically arranged in an ergonomic position for the driver as shown.

Figure 1:
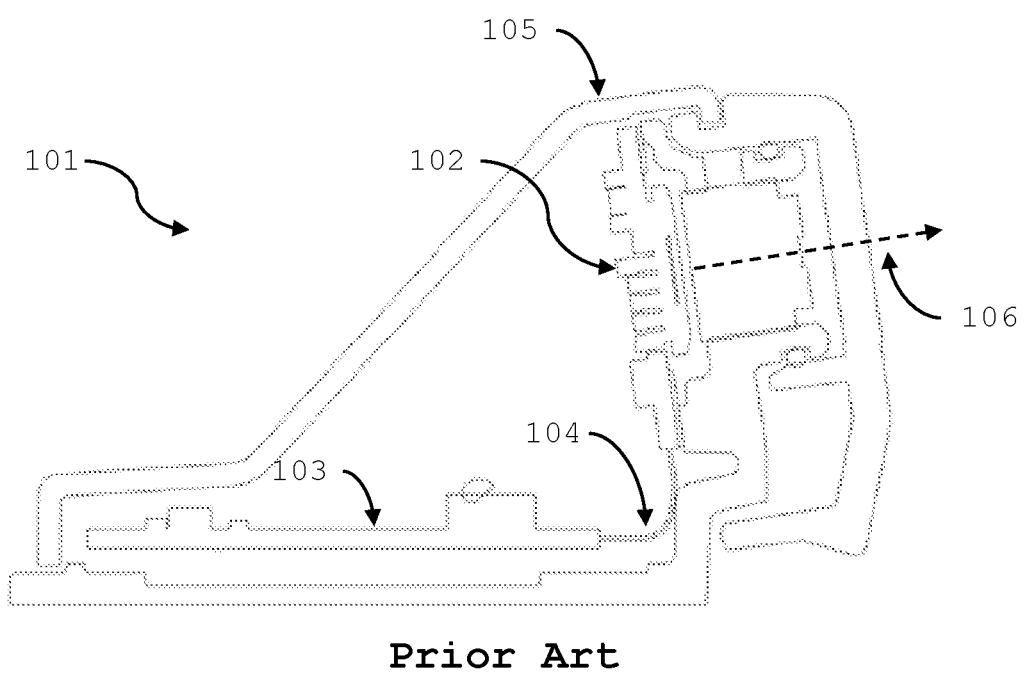
FIG. 1 graphically illustrates a side view of a camera module for an OMS according to a prior implementation.

To image a field of view 203 containing the driver (e.g., the driver's face), the image sensor and lens of a camera module integrated with the steering column housing 204 may be positioned to point directly towards the driver (e.g., as shown in FIG. 1). However, this approach may violate the space and/or cost factors mentioned above.

Instead, the present disclosure embraces utilizing a camera module that utilizes a planar reflector to image the occupant without the image sensor and lens pointed directly towards the occupant. This approach allows an image sensor and lens to be conveniently positioned within the steering column housing 204 and still image the occupant. In addition, this approach does not require any special circuit board technology (e.g., rigid-flex) and does not require significant alterations to the steering column housing design. One advantage of the planar reflector is that the image is not compressed or otherwise distorted upon reflection.

As shown in FIG. 2, a camera module may be mechanically coupled to the steering column housing 204 so that the image sensor and lens form an optical axis 206 (e.g., optical path, imaging axis, direction of imaging, imaging path, etc.) that is folded by a reflector by an angle 207 to point in a direction 106 towards the occupant 202. In other words, the reflector allows the camera module to image a field of view 203 containing the occupant 202 without being pointed directed at the occupant.

Figure 3:
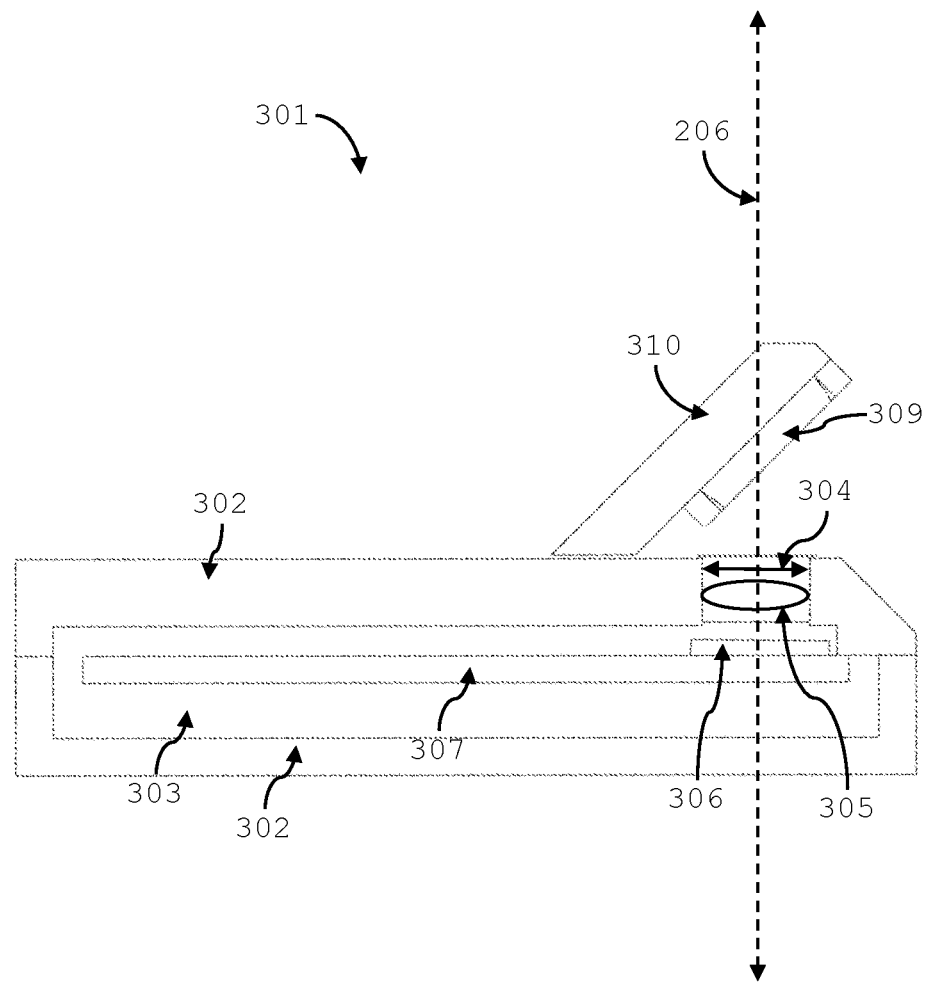
FIG. 3 graphically depicts a side cutaway view of a camera module according to one implementation of the present disclosure.

FIG. 3 illustrates a side view of an exemplary camera module 301 for an OMS. The camera module includes a housing 302 (i.e., module housing). The housing may be formed (e.g., molded, machined, etc.) from a variety of opaque materials (e.g., metal, plastic, etc.) to define a chamber 303 and an aperture 304. The housing may comprise two or more pieces that are mechanically coupled (e.g., bonded, fastened) so that light may enter the chamber 303 only through the aperture 304. A lens 305 (e.g., plano-convex, bi-convex, meniscus, etc.) or lens set (e.g., objective), typically having a fixed focal length and f-number, focuses light entering the aperture 304 onto an image sensor 306 (e.g., CCD, CMOS, etc.) to form a real image of a field of view 203 (e.g., containing the occupant). In some implementations, the lens 305 is mounted (e.g., bonded) in a lens holder that is mechanically coupled (e.g., threaded) to the housing. Further, the lens focus may be adjusted, in a certain implementation, by adjusting the lens holder's position (e.g., height) relative to the image sensor. The housing provides a modular aspect to the camera module, which can be advantageous for implementation. For example, the modular aspect may ease test, repair, replacement, and/or integration with different steering column housings.

As shown in FIG. 3, the image sensor 306 is mechanically and electrically coupled (e.g., soldered) flush with a surface of a printed circuit board (PCB) 307. The printed circuit board may be a single or multilayer rigid (e.g., FR-4) planar circuit board that includes the necessary electrical traces, vias, and components to power the image sensor and to process the electronic signals form the image sensor into digital images. In some implementations, the PCB also includes the processing necessary to analyze the digital images as described above. For example, a processor and an image sensor may be mechanically and electrically coupled to the same PCB using conventional techniques, thereby eliminating the need for a signal line (e.g., cable) to connect these elements.

The PCB is mechanically coupled (e.g., bonded or fastened) to the housing 302 so that the image sensor is aligned with the module aperture 304. The aperture 304 and the image sensor 306 (and the lens 305) define an optical axis 206. A planar reflector 309 redirects light from a direction other than along the optical axis 206 into the aperture 304, where it is focused by the lens 305 onto the image sensor 306.

The planar reflector 309 is typically a conventional mirror (e.g., front surface, metal, metal on glass, etc.) and may redirect (i.e., reflect) light from all visible (and near infrared wavelengths (NIR)) substantially the same. In certain implementations, however, the reflector 309 may have a filtering aspect that reflects light of a particular wavelength band more than light having wavelengths not in the particular wavelength band. This filtering aspect may be accomplished using an absorptive filter (e.g., colored glass filter) integrated with the reflector or may be accomplished using multiple thin-film (e.g., dielectric) layers (i.e., optical coating) deposited on a substrate (e.g., glass, crystal, etc.) as the reflector (e.g., dielectric mirror, Bragg mirror, dichroic filter, dichroic mirror, thin-film beamsplitter, hot/cold mirror, etc.).

In some implementations, an illuminator (e.g., one or more LEDs) may be integrated with the printed circuit board 307 (e.g., adjacent to the image sensor) and directed towards the reflector 309 to illuminate the field of view 203. In these implementations, the reflector serves two purposes. The reflector (i) directs light from the illuminator to the field of view 203 and (ii) directs light from the field of view 203 to the image sensor 306. In a further implementation, light from the illuminator may be activated/deactivated based on a light condition detected by the image sensor 306. The light for illumination is typically one or more near infrared wavelengths. In some implementations, the wavelength of the light for illumination may be selected to align with the filtering aspect of the reflector.

The reflector is typically mechanically coupled (e.g., bonded, fastened) to a reflector mount 310. As shown in FIG. 3, the reflector mount is mechanically coupled to the top surface of the housing at one end and extends away from the surface at an angle (e.g., about 45 degrees) over the aperture 304. The mechanical coupling between the reflector and the reflector mount may include an adjustment mechanism (e.g., tip/tilt) to fine-tune the position of the field of view imaged by the image sensor 306. In addition, the mechanical coupling between the reflector mount and the housing may include an adjustment mechanism to tune the reflectors position with respect to the aperture 304 or to tune the reflector's angle with respect to the optical axis 206.

Figure 4:
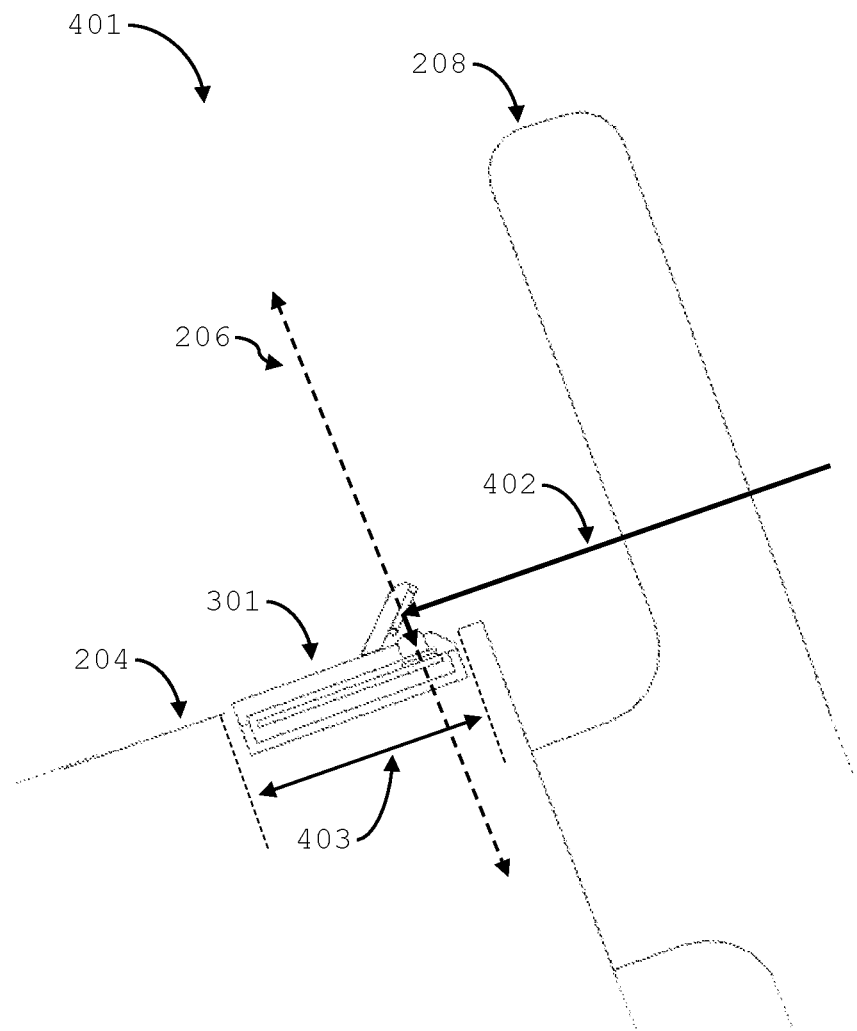
FIG. 4 graphically depicts a side view of an occupant monitoring system for a vehicle according to one implementation of the present disclosure.

FIG. 4 illustrates an occupant monitoring system 401 for a vehicle that utilizes the camera module described above. The camera module 301 is disposed (e.g., mechanically coupled) within the steering column housing 204 (e.g., in the steering-column housing chamber). The camera module 301 is positioned so that at least the planar reflector 309 extends through a steering-column aperture 403. The planar reflector 309 reflects light 402 from a field of view 203 containing the occupant 202 into the module aperture 304. The light reflected into the module aperture is focused by the lens onto the image sensor to produce a digital image of the occupant.

The OMS may include processing to analyze the image produced by the camera module 301 to detect dangerous driving behavior (e.g., inattention, drowsiness, etc.). The OMS may also include indicators, sensors, and controls, to take an action (e.g., alert, braking, etc.) based on the detected behavior. Accordingly, the camera module 301 for the OMS 401 shown in FIG. 4 may be communicatively coupled with other sensors (e.g., steering wheel sensors), illuminators (e.g., cabin illuminators), controls (e.g., braking controls), and processors to monitor an occupant (e.g., driver) and produce an action to promote safe driving.

In the specification and/or figures, typical implementations have been disclosed. The present disclosure is not limited to such exemplary implementations. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A camera module for an occupant monitoring system (OMS), the camera module comprising:
   a housing defining a chamber and an aperture on a surface of the housing, the aperture allowing light to enter the chamber;
   an image sensor positioned within the chamber and aligned with the aperture, wherein the image sensor and the aperture define an optical axis;
   a lens positioned along the optical axis between the image sensor and the aperture, the lens focusing light entering the aperture onto the image sensor;

a planar reflector, extending over the aperture from the surface of the housing, that reflects light into the aperture from a field of view that is not along the optical axis; and a reflector mount mechanically coupled to the surface of the housing that supports and positions the planar reflector at an angle with respect to the optical axis, wherein the angle is greater than zero degrees and less than 90 degrees.

2. The camera module according to claim 1, wherein the image sensor is disposed flush with a printed circuit board (PCB) positioned within the chamber.

3. The camera module according to claim 1, further comprising:

a lens holder mechanically coupled to the housing that supports the lens at a distance above the image sensor.

4. The camera module according to claim 3, wherein the lens holder is adjustable in the housing to change the distance between the lens and the image sensor.

5. The camera module according to claim 1, further comprising:

an illuminator that projects light along the optical axis and onto the planar reflector to illuminate the field of view.

6. The camera module according to claim 1, wherein the planar reflector substantially reflects a band of wavelengths and does not substantially reflect wavelengths not in the band of wavelengths.

7. The camera module according to claim 1, wherein the reflector mount is adjustable to change the angle of the planar reflector with the optical axis.

8. The camera module according to claim 1, wherein the reflector mount is mechanically coupled to the surface of the housing at one end and extends away from the surface of the housing at an angle over the aperture.

9. An occupant monitoring system for a vehicle, comprising:

a steering-column housing, the steering-column housing defining a steering-column aperture and a steering-column chamber;

a camera module, comprising:

a module housing defining a module chamber and a module aperture on a surface of the module housing, the module aperture allowing light to enter the module chamber, an image sensor positioned within the module chamber and aligned with the module aperture, wherein the image sensor and the module aperture define an optical axis, a lens positioned along the optical axis between the image sensor and the module aperture, the lens focusing light entering the module aperture onto the image sensor, a planar reflector, extending over the module aperture from the surface of the module housing, that reflects light into the module aperture from a field of view that is not along the optical axis, and a reflector mount mechanically coupled to the surface of the module housing that supports and positions the planar reflector at an angle with respect to the optical axis, wherein the angle is greater than zero degrees and less than 90 degrees;

wherein the camera module is disposed in the steering-column chamber so that the planar reflector extends through the steering-column aperture and so that the field of view contains an occupant in the vehicle.

10. The occupant monitoring system according to claim 9, wherein the image sensor is disposed flush with a printed circuit board (PCB) positioned within the module chamber.

11. The occupant monitoring system according to claim 9, further comprising:

a lens holder mechanically coupled to the module housing that supports the lens at a distance above the image sensor.

12. The occupant monitoring system according to claim 11, wherein the lens holder is adjustable in the module housing to change the distance between the lens and the image sensor.

13. The occupant monitoring system according to claim 9, further comprising:

an illuminator that projects light along the optical axis and onto the planar reflector to illuminate the field of view containing the occupant.

14. The occupant monitoring system according to claim 9, wherein the planar reflector substantially reflects a band of wavelengths and does not substantially reflect wavelengths not in the band of wavelengths.

15. The occupant monitoring system according to claim 9, wherein the reflector mount is adjustable to change the angle of the planar reflector with the optical axis.

16. The occupant monitoring system according to claim 9, wherein the occupant is the driver of the vehicle.

17. The occupant monitoring system according to claim 9, wherein the reflector mount is mechanically coupled to the surface of the module housing at one end and extends away from the surface of the module housing at an angle over the module aperture.

* * * * *